United States Patent [19]

Gansen et al.

[11] Patent Number: 5,063,253

[45] Date of Patent: Nov. 5, 1991

[54] PROCESS FOR THE PRODUCTION OF COLD-SETTING FLEXIBLE POLYURETHANE FOAMS WITH EXCELLENT DAMPING PROPERTIES

[75] Inventors: Peter Gansen, Cologne; Rudi Wolfgramm, Leverkusen; Klaus D. Wolf, Cologne, all of Fed. Rep. of Germany; John J. Lindsey, Pittsburgh, Pa.

[73] Assignees: Bayer Aktiengesellschaft, Leverkusen, Fed. Rep. of Germany; Mobay Corporation, Pittsburgh, Pa.

[21] Appl. No.: 502,346

[22] Filed: Mar. 30, 1990

Related U.S. Application Data

[63] Continuation of Ser. No. 312,524, Feb. 17, 1989, abandoned.

[30] Foreign Application Priority Data

Mar. 1, 1988 [DE] Fed. Rep. of Germany ....... 3806476

[51] Int. Cl.$^5$ .............................................. C08G 18/00
[52] U.S. Cl. .................................. 521/159; 521/173; 521/174; 521/914
[58] Field of Search ................ 521/159, 173, 174, 914

[56] References Cited

U.S. PATENT DOCUMENTS

| | | | |
|---|---|---|---|
| 3,857,800 | 12/1974 | Fishbein et al. | 521/174 |
| 3,865,762 | 2/1975 | Repiquet et al. | 521/174 |
| 4,008,189 | 2/1977 | van Lewen et al. | 521/174 |
| 4,469,823 | 9/1984 | Yeakey et al. | 521/173 |
| 4,929,646 | 5/1990 | Nicholo et al. | 521/173 |

Primary Examiner—Harold D. Anderson
Assistant Examiner—T. Mosley
Attorney, Agent, or Firm—Joseph C. Gil; Richard E. L. Henderson

[57] ABSTRACT

This invention relates to a process for the production of cold-setting flexible polyurethane foam useful for damping sound comprising reacting a polyisocyanate in the presence of water with (a) at least one polyether having an OH number of from 20 to 60 and containing at least two OH groups, wherein said polyether is based on 75 to 95% by weight propylene oxide and 5 to 25% by weight ethylene oxide; (b) a polyether or polyester having an OH number of from 150 to 400 and containing at least two OH groups; and (c) a polyether different from components (a) and (b) having an OH number of from 20 to 200 and containing at least two OH groups, wherein said polyether is based on propylene oxide and ethylene oxide and has an ethylene oxide content above 50% by weight based on the total amount of propylene oxide and ethylene oxide.

20 Claims, No Drawings

PROCESS FOR THE PRODUCTION OF COLD-SETTING FLEXIBLE POLYURETHANE FOAMS WITH EXCELLENT DAMPING PROPERTIES

This application is a continuation of application Ser. No. 07/312,524 filed Feb. 17, 1989 now abandoned.

BACKGROUND OF THE INVENTION

Cold-setting flexible polyurethane foams are normally used for the production of upholstery elements. Conventional cold foams are suitable for use as seating upholstery by virtue of their elasticity. By using special combinations of raw materials which are atypical of flexible foams, it is possible to produce cold-setting polyurethane foams which, in contrast to conventional cold foams, have advantageous insulating properties. These so-called "tired" foams (foams with slow recovery) are suitable for sound-proofing purposes and wherever good damping properties are required.

Open-celled polyurethane foams with a high flow resistance have the capacity to absorb airborne sound required of an acoustic material (see H. Schmidt: Schalltechnisches Wörterbuch, Düsseldorf 1984). The capacity for absorption of airborne sound, which is due to external friction at the interfaces, is to a large extent determined by the cell structure and openness of the cells of a foam. In cold-setting flexible polyurethane foams these properties can be adjusted to a certain extent without any need to alter the basic raw materials, i.e., the polyol and the isocyanate. The open cell structure alone is not sufficient for absorption in the lower frequency range and, particularly for absorbing structure borne sound it is necessary for the structure of the flexible polyurethane foam itself to have a capacity for intensive damping.

The damping property, which is characterized by the loss factor, may be considerably improved in polyurethane foams, particularly by using special polyols and/or isocyanates. DE-AS 2,751,774, for example, describes a sound damping composite system which contains a flexible polyurethane foam as the spring in a mass-spring system. The flexible foam described in said specification has good damping properties which prevent coincidence break-in at a frequency range of from 150 to 10,000 Hz. The good damping is achieved by a combination of raw materials containing about 20% rigid foam polyol with a hydroxyl number of about 400 and 80% flexible foam polyol with a hydroxyl number of about 50. An additional insulating and damping effect is obtained by including heavy spar as inorganic filler.

DE-OS 3,313,624 describes a combination of raw materials in which the hydroxyl-containing component includes inter alia at least two different polyether polyols. One of these polyols must have an OH number of from 180 to 400 and must be present in the polyol mixture at a concentration of at least 15% by weight. Flexible polyurethane foams with moduli of elasticity of about $5 \times 10^5$ N/m$^2$ and loss factors of about 0.35 may be produced with such a combination.

It was an object of the present invention to find a combination of raw materials for the production of highly damping foams, i.e., foams which have a loss factor of at least 0.5 and preferably above 0.9. It was surprisingly found that this problem could be solved according to the invention, as described below.

SUMMARY OF THE INVENTION

The invention relates to a process for the production of cold-setting flexible polyurethane foams having excellent damping properties comprising reacting polyisocyanates with a) at least one polyether having an OH number of from 20 to 60 and containing at least two OH groups, wherein said polyether is based on 75 to 95% by weight propylene oxide and 5 to 25% by weight ethylene oxide;

b) a polyether or polyester having an OH number of from 150 to 400 and containing at least two OH groups; and c) a polyether different from components a) and b) having an OH number of from 20 to 200 and containing at least two OH groups, wherein said polyether is based on propylene oxide and ethylene oxide and has an ethylene oxide content above 50% by weight based on the total amount of propylene oxide and ethylene oxide, in the presence of water and, optionally, organic blowing agents, catalyst and foam stabilizers and, optionally, other auxiliary agents and additives.

DETAILED DESCRIPTION OF THE INVENTION

In a preferred process, the polyisocyanate is reacted with the polyether component c) in a first stage to produce a prepolymer containing isocyanate groups. The prepolymer is then reacted with polyol components a) and b) in the presence of water and/or organic blowing agents, catalysts and foam stabilizers and, optionally, other auxiliary agents and additives.

According to another preferred process, the polyisocyanate is reacted with polyether component a) in a first stage to produce a prepolymer containing isocyanate groups. This prepolymer is then reacted with components c) and b) in the presence of water and/or organic blowing agents, catalysts and foam stabilizers and, optionally, other auxiliary agents and additives.

According to another preferred process, the three components a), b) and c) which contain OH groups are reacted with only a portion of the polyisocyanate to produce a hydroxyl-containing prepolymer which is then reacted with the remaining portion of the polyisocyanate in the presence of water and/or organic blowing agents, catalysts and foam stabilizers and, optionally, other auxiliary agents and additives.

Component b) is preferably used in a quantity of from 10 to 20% by weight, based on the total amount of components a), b) and c), and component c) is preferably used in a quantity of from 30 to 70% by weight, based on the total amount of components a), b) and c).

The polyether component c) preferably has an OH number of from 25 to 100. The polyisocyanates used according to the invention are preferably aromatic polyisocyanates. Polyether component a) used according to the invention preferably has an OH number of from 25 to 40. The OH-containing component b) is preferably at an at least trifunctional polyether with OH number from 150 to 400 and is based on propylene oxide.

The following are examples of starting components which are used according to the invention for the production of the flexible polyurethane foams:

1. Polyisocyanates such as diphenylmethane diisocyanate and/or tolylene diisocyanate, e.g., 2,4- and 2,6- tolylene diisocyanate, and any mixtures of these isomers ("TDI"); 4,4'- and/or 2,4'-diphenylmethane diisocyanates ("MDI"); hexamethylene diisocyanate; isophorone diisocyanate; polyphenyl polymethylene polyisocyanates which may be prepared by anilineformaldehyde condensation followed by phosgenation ("crude MDI"); polyisocyanates containing carbodimide groups, urethane groups, allophanate groups, isocyanurate groups, urea groups, or biuret groups derived by the modification of 2,4- and/or 2,6-tolylene diisocyanate or of 4,4'- and/or 2,4'-diphenylmethane diisocyanate and/or of hexamethylene diisocyanate and/or isophorone diisocyanate; and alkyl-substituted types of MDI as described, for example, in DE-OS 2,935,318, DE-OS 3,032,128, and DE-OS 3,032,358.

The following types of MDI are preferred polyisocyanates for the process according to the invention:
  a) Diphenylmethane diisocyanates mixed with polyphenyl-polymethylene polyisocyanates, in which the proportion of polyphenyl-polymethylene polyisocyanates may be from 0 to 40% by weight and the proportion of diphenylmethane diisocyanate isomers may be from 100 to 60% by weight.
  b) Urethane-modified aromatic di- and polyisocyanates having an isocyanate content of from 15 to 30% by weight and obtained by the reaction of a mixture, as described under a), of diphenylmethane diisocyanates and polyphenyl-polymethylene polyisocyanates with one or more hydroxyl compounds having a functionality of from 2 to 6.
  c) Mixtures of the MDI products described under a) and/or b) having a maximum of 25% by weight of aliphatic, cycloaliphatic, heterocyclic or other aromatic polyisocyanates, as described e.g., by W. Siefken in *Justus Liebigs Annalen der Chemie*, 562, pages 75 to 136.

2. Mixtures of three polyols, each containing at least two reactive OH groups.

The first component a) is a polyether polyol of the flexible foam type, which is normally di- to hexafunctional, covers an OH range of from 25 to 60, and is ethylene oxide terminated.

The second component b) in most cases consists of a polyether polyol based on propylene oxide. Polyesters and polyether polyols containing small proportions of ethylene oxide are also suitable. Linear and higher functional types of polyols may also be used in addition to the preferred trifunctional polyols.

The third component c) of the polyol mixtures is a polyether polyol having an OH number of from 20 to 200, a functionality of from 2 to 6, and a high ethylene oxide content. The polyether polyols typical of flexible foams generally contain ethylene oxide at a concentration of not more than 20% in addition to propylene oxide, but for the high damping foam according to the invention it is necessary to use a polyether polyol c) with a high ethylene oxide content (i.e., above 50% by weight). For obtaining the high degree of damping desired, the concentration of this polyol must exceed 30%, based on the total amount of polyol components a), b) and c).

3. Optionally, compounds containing at least two isocyanate reactive hydrogen atoms and having a molecular weight of from 32 to 399. Such compounds contain hydroxyl groups and/or amino groups and/or thiol groups and/or carboxyl groups, preferably hydroxyl groups and/or amino groups, and are used as chain lengthening agents or cross-linking agents. These compounds generally contain from 2 to 8, preferably from 2 to 4, isocyanate reactive hydrogen atoms. Examples are described in DE-OS 2,832,253, pages 10 to 20.

4. Water as blowing agent, preferably in a quantity of from 1 to 4 parts by weight per 100 parts by weight of the polyol mixture containing a), b), and c).

5. Optionally, auxiliary agents and additives such as
  a) readily volatile organic substances as additional blowing agents;
  b) reaction accelerators and reaction retarders of the known type used in the usual quantity; and
  c) surface-active additives such as emulsifiers and foam stabilizers; cell regulators of known type such as paraffins or fatty alcohols or dimethylpolysiloxanes; pigments or dyes; flame retardants of known type such as trichloro-ethylphosphate or tricresylphosphate; stabilizers against aging and weathering; plasticizers; fungistatic and baceteriostatic substances; and fillers such as barium sulphate, kieselguhr, carbon black or whiting.

These optional auxiliary agents and additives are described, for example, in DE-OS 2,732,292, pages 21 to 24.

Further examples of additives optionally used according to the invention, such as surface-active additives, foam stabilizers, cell regulators, reaction retarders, stabilizers, flame retardants, plasticizers, dyes and fillers, and fungistatic and bacteriostatic substances, as well as details concerning the use and mode of action of these additives, are described in Kunststoff-Handbuch, Volume VII, published by Vieweg and Hochtlen, Carl-Hanser-Verlag, Munich 1966, e.g., on pages 121 to 205.

According to the invention, all the components are reacted together at an isocyanate index above 70, preferably at an index of from 70 to 115. The isocyanate index, a term frequently used when describing the production of polyurethane foams, gives an indication of the degree of cross-linking of the foam. It is customary to regard a foam as produced with an index of 100 if the isocyanate has been used in the stoichiometric proportion or the theoretically required quantity. This index may also be used to define the degree of over-cross-linking or under-cross-linking. The index is calculated according to the following general formula:

$$\text{Index} = \frac{\text{Quantity of isocyanate (actual)} \times 100}{\text{Quantity of isocyanate (theoretical)}}$$

According to the invention, foaming is carried out in closed molds, which may be made of a metal such as aluminum or a synthetic resin such as an epoxide resin. The foamable reaction mixture foams up inside the mold to form the molded product. According to the invention, the quantity of foamable reaction mixture introduced into the mold may be either just sufficient to fill the mold with foam or may exceed this quantity. The latter process is known as overcharging, a molding procedure that has been disclosed, e.g., in U.S. Pat. Nos. 3,178,490 and 3,182,104.

The advantageous properties of the polyurethane foams are achieved according to the invention by using the special composition of the polyol component. Certain mixtures (e.g., Example 1) are unstable and separate within hours, but A/B systems which are stable in storage could be obtained by carrying out a previous prepolymerization reaction. These systems have technical advantages for processing. Three prepolymerization processes were employed for preventing separation of the polyol component:

Preparation of a prepolymer containing isocyanate groups by a preliminary reaction of all or part of the polyether c) in the isocyanate. Prepolymers having isocyanate contents of from 10 to 20% have been found satisfactory.

Preparation of a prepolymer containing isocyanate groups by a preliminary reaction of the polyol a) used for producing a flexible foam with the isocyanate. Component b) is miscible with the polyol, which has a high ethylene oxide content. For this reason stable formulations can be prepared.

Preparation of an OH-functional prepolymer by a reaction of the polyol mixture with small proportions of the isocyanate. The preliminary cross-linking prevents phase separation. The quantity of isocyanate added is calculated to keep the viscosity of the polyol within a range suitable for processing but at the same time to prevent separation.

The flexible foams produced according to the invention have gross densities within a range of from 25 to 250 kg/m$^3$ and loss factors above 0.8 without the addition of inorganic or organic fillers. The polyurethane foams may be adjusted from soft to hard, depending on the isocyanate index and proportion of blowing agent, without losing their flexibility.

The following are examples of suitable applications of the highly damping foams produced according to the invention:

As springs in mass-spring systems (acoustics). Motor vehicles manufactured today are frequently fitted with carpet floor constructions composed of a textile lining, a heavy mat (mass), and a PU foam (spring) for reducing noise in the passenger space. Highly damping foam can prevent intrusions of resonance at low frequencies and at the same time acts as sound absorbing medium.

For sound absorption (acoustics) A high loss factor improves the good damping properties of PU foams.

For energy absorption (e.g., impact energy) The low recoil elasticity of the foams produced according to the invention (see Example 1) demonstrates the high energy absorption of the foams produced according to the invention.

The present invention, which is set forth in the foregoing disclosure, is not to be construed or limited either in spirit or in scope by these examples. Those skilled in the art will readily understand that known variations of the conditions of the following preparative procedures can be used. In the following examples, all percentages are percentages by weight and all temperatures are degrees Celsius unless otherwise noted.

PREFERRED EMBODIMENTS OF THE INVENTION

Example 1

Preparation of a Polyurethane Foam

A Component 25 parts by weight of a polyoxypropylene-polyoxyethylene triol started with trimethylolpropane and containing 14% polymerized oxyethylene end groups and having an OH number of 28 (Polyol A)

15 parts by weight of a polyoxypropylene triol started with trimethylolpropane and having an OH number of 380 (Polyol B)

60 parts by weight of a polyoxypropylene-polyoxyethylene triol started with glycerol and containing 10% polymerized oxyethylene end groups and having a total oxyethylene group content of 73% and an OH number of 36 (Polyol C)

2.0 parts by weight water 0.3 parts by weight dimethylethanolamine 0.6 parts by weight triethylenediamine (33% by weight in dipropylene glycol)

0.83 parts by weight bis(dimethylaminopropyl)amine 1.0 part by weight triethanolamine 1.0 part by weight silicone stabilizer B 4690 (Goldschmidt AG, Essen)

B Component

MDI 85/20 (mixture of 65% of 4,4'- and 20% of 2,4'-diisocyanatodiphenylmethane and 15% of higher functional polyisocyanates of the diphenylmethane series)

100 Parts by weight of the A component are vigorously mixed with 45.5 parts by weight of the B component (isocyanate index 86). The reaction mixture is introduced into a rectangular metal mold which has been heated to 50° C., the mold is closed with a metal lid, and the reaction mixture is allowed to foam up.

The resulting flexible polyurethane foam has the following mechanical properties:

| | |
|---|---|
| Gross density (DIN 53 420) | 81 kg/m$^3$ |
| Tensile strength (DIN 53 571) | 95 kPa |
| Elongation at break (DIN 53 571) | 140% |
| Compression resistance 40% (DIN 53 577) | 4.4 kPa |
| Compression set (50%, 22 h, 70° C., DIN 53 572) | 2.9% |
| Recoil elasticity (DIN 53 573) | 14% |
| Loss factor (determined by the lift and swing process) | 0.88 |

Example 2

A Component 25 parts by weight Polyol A 15 parts by weight Polyol B 60 parts by weight Polyol C 2.5 parts by weight water 0.3 parts by weight dimethylethanolamine 0.6 parts by weight triethylenediamine (33% by weight in dipropylene glycol)

0.83 parts by weight bis(dimethylaminopropyl)amine 1.0 part by weight triethanolamine 1.0 part by weight silicone stabilizer B 4900 (Goldschmidt AG, Essen).

B Component

Mixture of 40% of TDI 65 and 60% of crude MDI

100 Parts by weight of the A component are vigorously mixed with 43.1 parts by weight of the B component (isocyanate index 90). The reaction mixture is introduced into a rectangular mold which has been heated to 50° C., the mold is closed with a metal lid, and the reaction mixture is allowed to foam up. Properties of the polyurethane flexible foam:

| | |
|---|---|
| Gross density (DIN 53 420) | 78 kg/m$^3$ |
| Compression strength 40% (DIN 53 571) | 10.1 kPa |
| Loss factor | 0.64 |

Example 3

Preparation of a Polyurethane Flexible Foam

A Component
25 parts by weight Polyol A
15 parts by weight Polyol B
60 parts by weight Polyol C
2.5 parts by weight water
0.3 parts by weight dimethylethanolamine
0.6 parts by weight triethylenediamine (33% by weight in dipropylene glycol)
0.83 parts by weight bis(dimethylaminopropyl)amine
1.00 part by weight of silicone stabilizer B 4900 (Goldschmidt AG, Essen).
B Component Mixture of 90% of TDI modified by partial urethanization and partial allophanatization and 10% of crude MDI having an isocyanate content of about 40%.

A molded part having the following properties is produced as in Example 1 from 100 parts by weight of Component A and 41.1 parts by weight of Component B (isocyanate index 90):

| | |
|---|---|
| Gross density (DIN 53 410) | 82 kg/m³ |
| Compression strength 40% (DIN 53 571) | 3.9 kPa |
| Loss factor (determined by the lift and swing process) | 0.57 |

Example 4

The formulations described in Examples 1 to 3 do not have stable phases. A formulation with stable phases is obtained in Example 4 by prepolymerization of the polyol used for the flexible foam (polyether component a)).

A Component
40 parts by weight of a polyoxypropyl-oxyethylene polyol started with sorbitol and containing 82.2% of oxyethylene end groups and having an OH number of 100 (Polyol D)
40 parts by weight of Polyol C
20 parts by weight of Polyol B
3.33 parts by weight of water
0.40 parts by weight of triethylenediamine (33% by weight in dipropylene glycol)
0.67 parts by weight bis(dimethylaminopropyl)amine
0.40 parts by weight bis(dimethylaminopropyl)ether
0.27 parts by weight silicone stabilizer B 4900 (Goldschmidt AG, Essen)
B Component A semi-prepolymer having an isocyanate content of about 25% obtained by the reaction of 80 parts by weight of MDI 85/20 with 20 parts by weight of Polyol A. The reaction is carried out at room temperature with constant stirring and is completed after 24 hours.

A molded part having the following properties is produced as in Example 1 from 100 parts by weight of Component A and 91.5 parts by weight of Component B (isocyanate index 70):

| | |
|---|---|
| Gross density (DIN 53 420) | 92 kg/m³ |
| Compression strength 40% (DIN 53 571) | 5.04 kPa |
| Loss factor (determined by the lift and spring process) | 1.09 |

Example 5

Preparation of a Polyurethane Flexible Foam

A Component
102 parts by weight of an OH-functional prepolymer prepared as follows: A liquid composed of phases which are stable for several weeks is prepared from 25 parts by weight of Polyol A, 15 parts by weight of Polyol B, 60 parts by weight of Polyol C, and 2 parts by weight of MDI 85/20 with constant stirring (reaction time 24 hours)
2.5 parts by weight water
0.6 parts by weight triethylenediamine (33% by weight in dipropyleneglycol)
0.1 parts by weight bis(dimethylaminopropyl)ether
1.0 part by weight methyl dicyclohexylamine
0.6 parts by weight PU cross-linking agent 56 (Bayer AG, Leverkusen)
0.4 parts by weight silicone stabilizer B 4900 (Goldschmidt AG, Essen)
B Component
MDI 85/20

100 Parts by weight of the A component are vigorously mixed with 43.8 parts by weight of the B component (isocyanate index 80) and the mixture is introduced into a metal mold as in Example 1. Properties of the polyurethane foam:

| | |
|---|---|
| Gross density (DIN 53 420) | 73.4 kg/m³ |
| Compression strength 40% (DIN 53 571) | 4.53 kPa |
| Loss factor (determined by the lift and swing process) | 1.01 |

What is claimed is:

1. A process for the production of cold-setting flexible polyurethane foam useful for damping sound comprising reacting a polyisocyanate in the presence of water with
   a) at least one polyether having an OH number of from 20 to 60 and containing at least two OH groups, wherein said polyether is based on 75 to 95% by weight propylene oxide and 5 to 25% by weight ethylene oxide;
   b) a polyether or polyester having an OH number of from 150 to 400 and containing at least two OH groups, wherein said component b) is used in a quantity of from 10 to 20% by weight based on the total amount of components a), b), and c); and
   c) a polyether different from components a) and b) having an OH number of from 20 to 200 and containing at least two OH groups, wherein said polyether is based on propylene oxide and ethylene oxide and has an ethylene oxide content above 50% by weight based on the total amount of propylene oxide and ethylene oxide, wherein said component c) is used in a quantity of from 30 to 70% by weight based on the total amount of components a), b), and c).

2. A process according to claim 1 wherein the polyisocyanate is reacted with components a), b), and c) in the presence of
d) one or more auxiliaries or additives.

3. A process according to claim 2 wherein the auxiliary or additive is an organic blowing agent, catalyst, foam stabilizer, or combination thereof.

4. A process according to claim 1 wherein the polyisocyanate is reacted with component c) in a first stage to form a prepolymer containing isocyanate groups and wherein said prepolymer is further reacted with components a) and b) in the presence of water and one or more auxiliaries or additives.

5. A process according to claim 4 wherein the auxiliary or additive is an organic blowing agent, catalyst, foam stabilizer, or a combination thereof.

6. A process according to claim 1 wherein the polyisocyanate is reacted with component a) in a first stage to form a prepolymer containing isocyanate groups and wherein said prepolymer is further reacted with components b) and c) in the presence of water and one or more auxiliaries or additives.

7. A process according to claim 6 wherein the auxiliary or additive is an organic blowing agent, catalyst, foam stabilizer, or a combination thereof.

8. A process according to claim 1 wherein the components a), b), and c) are reacted with only a portion of the polyisocyanate to form a hydroxyl-containing prepolymer and wherein said prepolymer is further reacted with the remaining portion of the polyisocyanate in the presence of water and one or more auxiliaries or additives.

9. A process according to claim 8 wherein the auxiliary or additive is an organic blowing agent, catalyst, foam stabilizer, or a combination thereof.

10. A process according to claim 1 wherein the polyisocyanate is an aromatic polyisocyanate.

11. A process according to claim 1 wherein component a) has an OH number of from 25 to 40.

12. A process according to claim 1 wherein component b) is an at least trifunctional polyether having an OH number of from 150 to 400, wherein said polyether is based on propylene oxide.

13. A process according to claim 1 wherein component c) has an OH number of from 25 to 100.

14. A process according to claim 1 for the production of cold-setting flexible polyurethane foam useful for damping sound comprising reacting an aromatic polyisocyanate in the presence of water with a) at least one polyether having an OH number of from 25 to 40 and containing at least two OH groups, wherein said polyether is based on 75 to 95% by weight propylene oxide and 5 to 25% by weight ethylene oxide;

b) an at least trifunctional polyether having an OH number of from 150 to 400 and containing at least two OH groups, wherein said polyether is based on propylene oxide, wherein said component b) is used in a quantity of from 10 to 20% by weight based on the total amount of components a), b), and c); and c) a polyether different from components a) and b) having an OH number of from 25 to 100 and containing at least two OH groups, wherein said polyether is based on propylene oxide and ethylene oxide and has an ethylene oxide content above 50% by weight based on the total amount of propylene oxide and ethylene oxide, wherein said component c) is used in a quantity of from 30 to 70% by weight based on the total amount of components a), b), and c), in the presence of d) one or more auxiliaries or additives.

15. A process according to claim 14 wherein the polyisocyanate is reacted with component c) in a first stage to form a prepolymer containing isocyanate groups and wherein said prepolymer is further reacted with components a) and b) in the presence of water and one or more auxiliaries or additives.

16. A process according to claim 15 wherein the auxiliary or additive is an organic blowing agent, catalyst, foam stabilizer, or a combination thereof.

17. A process according to claim 14 wherein the polyisocyanate is reacted with component a) in a first stage to form a prepolymer containing isocyanate groups and wherein said prepolymer is further reacted with components b) and c) in the presence of water and one or more auxiliaries or additives.

18. A process according to claim 17 wherein the auxiliary or additive is an organic blowing agent, catalyst, foam stabilizer, or a combination thereof.

19. A process according to claim 14 wherein the components a), b), and c) are reacted with only a portion of the polyisocyanate to form a hydroxyl-containing prepolymer and wherein said prepolymer is further reacted with the remaining portion of the polyisocyanate in the presence of water and one or more auxiliaries or additives.

20. A process according to claim 19 wherein the auxiliary or additive is an organic blowing agent, catalyst, foam stabilizer, or a combination thereof.

* * * * *